Dec. 16, 1969   SHUZO WAKAI ET AL   3,483,919
ELECTRIC REFRIGERATOR WITH DEFROSTING MEANS
Filed Feb. 1, 1968   3 Sheets-Sheet 1

SHUZO WAKAI AND
TAKEJI KOBAYASHI
INVENTORS

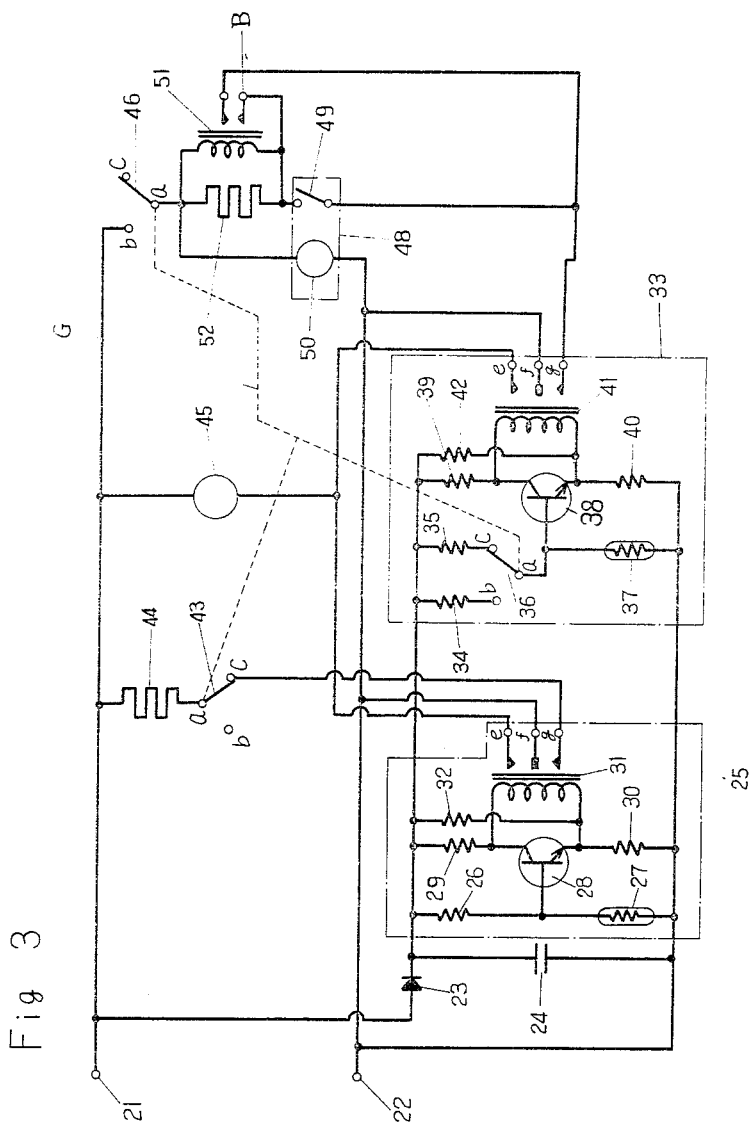

United States Patent Office

3,483,919
Patented Dec. 16, 1969

3,483,919
ELECTRIC REFRIGERATOR WITH DEFROSTING MEANS
Shuzo Wakai and Takeji Kobayashi, Takatsuki-shi, Japan, assignors to Matsushita Electronics Corporation, Kadoma-shi, Osaka-fu, Japan
Filed Feb. 1, 1968, Ser. No. 702,318
Claims priority, application Japan, Feb. 13, 1967, 42/9,701
Int. Cl. F25b 29/00, 41/00; F25d 21/08
U.S. Cl. 165—30                             5 Claims

ABSTRACT OF THE DISCLOSURE

As refrigerator capable of controlling the temperatures of its refrigeration compartment and freezing compartment independently of each other by means of electronic temperature controllers. While defrosting the freezing compartment, the temperature therein is controlled so as not to rise excessively by using a thermistor to automatically detect the temperature and then suspending the defrosting operation whenever the temperature exceeds a certain level. While cooling the freezing compartment, the temperature of the refrigeration compartment is controlled so as not to fall below a certain level by using a thermistor to detect the temperature and turning on a heater whenever the temperature falls below a certain level. Thus, both the freezing compartment and the refrigeration compartment can be kept at the temperatures most suitable, respectively, for freezing and cool storing.

---

This invention relates to an electric refrigerator of the freezer-refrigerator type which has a freezing compartment and a refrigerating compartment with cooling means sharing the same evaporator.

In general, it is desirable that a multi-compartment refrigerator have separate constant temperatures in its storing compartments while it is in use; that is, both a freezing compartment and a refrigerating compartment should maintain their own constant temperatures. However, in a conventional freezer-refrigerator type of device, the temperature controller is of the type that controls the temperature in only the freezing compartment. For this reason, such a refrigerator has a drawback that the temperature in its refrigerator compartment is not directly adjusted due to changes caused by opening and shutting of the door of the refrigerator compartment and by the temperature of the surrounding air. Besides, the thermostat, which is supposed to detect a change of temperature in the freezing compartment, works by mechanical operation or gas-operation, and consequently, it lacks sufficient sensitivity to respond precisely and quicky to any change of the freezing compartment temperature.

Recently, the necessity of further lowering of the temperature of the freezing compartment for preserving frozen foods has been increased by the general availability of such frozen foods. However, such excessive lowering of the temperature of the freezing compartment inevitably causes unnecessary lowering of the temperature of the adjacent refrigerating compartment and results in freezing ordinary foods therein which it is only desired to store cool. This is the background of the growing necessity for a new kind of electric refrigerator capable of preserving frozen foods in its freezing compartment, and at the same time, of storing ordinary foods in the most suitable condition in its refrigerating compartment.

Another big problem in a refrigerator is the defrosting operation. Conventional freezer-refrigerators carry out the defrosting operation by defrosting for a predetermined period irrespective of the temperature in the various compartments. Such a conventional defrosting method has a drawback in that either the defrosting operation is insufficient, or on the contrary, continues for too long, which causes an excessive temperature rise in both the freezing and refrigerating compartments.

For the purpose of solving the foregoing problems, this invention seeks to produce a novel refrigerator embodying an electronic thermostat capable of controlling the temperature of the freezing compartment and that of the refrigerating compartment independently of each other.

Thus, the primary object of the present invention is to provide a refrigerator in which the temperature of the freezing compartment can be kept at levels most suitable for storing, respectively, frozen foods and ordinary foods.

A secondary object of the present invention is to provide a refrigerator in which, when the temperature of the freezing compartment rises to a predetermined temperature during the defrosting operation, the defrosting operation is automatically suspended by the electronic thermostat in order to prevent the temperature of the freezing compartment from rising too high.

The details of the present invention are set forth more fully in the following detailed explanation of the embodiments of the invention, reference being made to the accompanying drawings in which:

FIG. 2 is a circuit diagram of the refrigerator of the present invention; and

FIG. 3 is a circuit diagram of a modified form of the refrigerator of the present invention.

Figure 1:
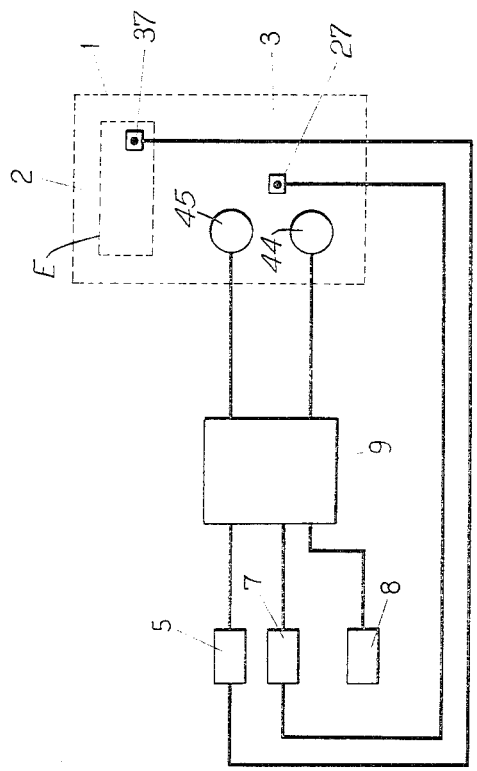
FIG. 1 is a block diagram of an electric refrigerator according to the present invention.

In FIG. 1, a housing 1 of the electric refrigerator comprises a freezing compartment 2 and the refrigerating compartment 3 and a common evaporator E. A thermistor 37, which is an element of the electronic thermostat 5 is installed in the freezing compartment 2 for the purpose of detecting changes of temperature in the said compartment. Another thermistor 27, which also is an element of another thermostat 7 is installed in the refrigerating compartment 3 for the purpose of detecting changes in the temperature in that compatment. A defrost starting device 8 is provided which is a timer in this embodiment, for directing the start of the defrosting operation. A controlling circuit 9 is connected with the electronic thermostats 5 and 7 and the timer 8, and is operated by directions generated in said elements, and functions to start operation of the compressor motor 45 to compress refrigerant (for instance, mainly consisting of dichlorodifluoromethane) and feed it through a conventional cooling system to the common evaporator E, and to operate the heater 44 which heats the refrigerating compartment to keep the compartment at a suitable temperature during the freezing period.

Electronic thermostat devices to be used in household appliances such as electric refrigerators should be moderate in cost yet reliable in performance. These requirements can be fully satisfied by the device of the present invention.

Figure 2:
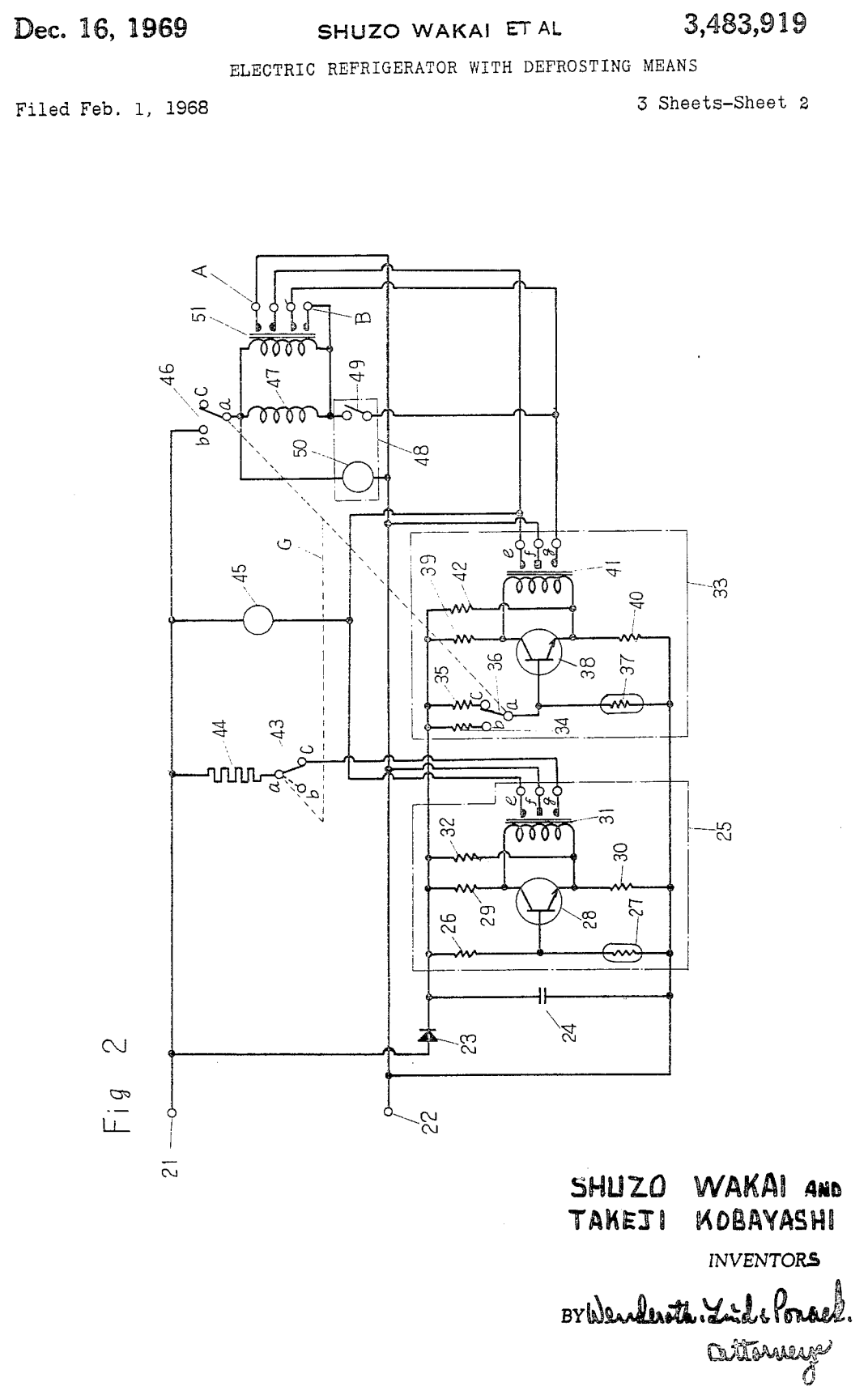

FIG. 2 shows a circuit diagram of the electric refrigerator embodying the present invention. Terminals 21 and 22 are for connection to a commercial power source. A diode 23 and a condenser 24 are connected to said terminals in a rectifying circuit for two electronic thermostats, generally designated 25 and 33.

The first electronic thermostat 25 is for controlling the temperature in the refrigerating compartment of the refrigerator, and has a resistor 26 and a thermistor 27, which is installed in said refrigerating compartment, connected in series with each other for imparting a base bias voltage to an npn transistor 28 from the connection therebetween, the resistor and the thermistor being connected in parallel with the condenser 24. A first collector resistor 29 is connected between the positive end of the condenser 24 and the collector electrode of the transistor 28, and a first emitter resistor 30 is connected between the negative end of the condenser 24 and emitter electrode of the transistor 28. The winding of a first relay 31 is connected in parallel with the said transistor 28. A resistor 32 for imparting emitter bias voltage to the transistor 28 is connected between the positive end of the condenser 24 and the emitter electrode. The resistors 26, 29 and 30, thermistor 27 and transistor 28 are thus connected in a bridge type circuit.

The second electronic thermostat 33 is for controlling the temperature of the freezing compartment of the refrigerator, and has the respective one end of resistors 34 and 35 connected to the positive end of the condenser 24, and the other end connected to fixed contacts $b$ and $c$, respectively, of a switch 36. The moving contact $a$ of the switch 36 is connected to one end of a thermistor 37 and the connection therebetween is connected to the base electrode of an npn transistor 38. The thermistor 37 is installed in the freezing compartment of the refrigerator and its other end is connected to the negative end of the condenser 24. Therefore, the resistor 34 or 35 and the thermistor 37 are connected in series with each other for imparting a base bias voltage to the transistor 38 from the connection therebetween. A second collector resistor 39 is connected between the positive end of the condenser 24 and the collector electrode of the transistor 38, and a second emitter resistor 40 is connected between the negative end of the condenser 24 and the emitter electrode of the transistor 38. The winding of a second relay 41 is connected in parallel with the said transistor 38. A resistor 42 for imparting emitter bias voltage to the transistor 38 is connected between the positive end of the condenser 24 and the emitter electrode. The resistors 34 and 35, 39 and 40, thermistor 37 and transistor 38 are thus connected in a bridge type circuit.

Respective contacts $e$ of the relays 31 and 41 are connected to the one end of a compressor motor 45, while the other end of the compressor motor 45 is connected to the power source terminal 21. Respective contacts $f$ of the relays 31 and 41 are connected to the power source terminal 22. The contact $g$ of the relay 31 is connected to the contact $c$ of a switch 43 of the manual gang switch G. By means of the said gang switch G the operation of the refrigerator for cooling is selected by contacting the respective moving contacts $a$ of the switches 36, 43 and 46, with the respective contacts $b$ of the switches, while operation of the refrigerator for freezing is selected by contacting the respective contacts $a$ with the respective contacts $c$.

Fixed contact $b$ of the switch 46 is connected with the power source terminal 21, and moving contact $a$ is connected with one end of a winding 47 of a defrosting valve. Fixed contact $b$ of the switch 43 and fixed contact $c$ of the switch 46 are not connected to anything. The other end of the winding 47 of the defroster valve is connected to a switch 49 of a timer 48 for controlling the timing of the defrosting by means of a timing motor 50. The winding of a relay 51 is connected in parallel with the winding 47 of the defrosting valve. One contact of the contacts A of the relay 51 is connected with the power source terminal 22, and the other contact thereof is connected with the connection point between contacts $e$ of the relays 31 and 41, and thus to one end of the compressor motor 45. To one contact of the contacts B of the relay 51 are connected one end of the winding 47 of the defrosting valve and also one end of the winding of the relay 51, while to the other contact of the contacts B of the relay are connected one end of the switch 49 and the contact $g$ of the relay 41.

The operation of the above-described refrigerator is as follows:

First, there will be described the cooling operation where respective contacts $a$ are in contact with the respective contacts $b$ in the gang switch G. In this condition, excessive rise in the temperature of the refrigerating compartment from a predetermined level reduces the resistance of thermistor 27 in the first electronic thermostat 25, resulting in a decrease of the base bias voltage applied to the transistor 28. This change places the transistor 28 in a totally or nearly totally cut-off state, making its collector-emitter conduction low, and hence increases the current flow in the winding of the relay 31. Accordingly, contact $f$ of the relay 31 touches the contact $e$, and a circiut is completed from the power source terminal 21 through the compressor motor 45, and contacts $e$ and $f$ of the relay 31, to he power source terminal 22, resulting in cooling of the refrigeration compartment due to the driving of the compressor motor 45. Then, when the temperature of the said refrigerating compartment falls to the predetermined level, the resistance of the thermistor 27 increases, raising the bias voltage of the transistor 28 and thus making it conductive. When said transistor 28 becomes conductive, the current flowing through the winding of the relay 31 decreases. When the current in the winding decreases to a certain value, the contact $f$ of the relay 31 separates from the contact $e$ and touches the contact $g$. Accordingly, the said circuit is broken and the compressor motor 45 stops.

In the electronic thermostat 33, with the contacts $b$ and $a$ in the switch 36 in contact, the base bias voltage of the transistor 38 is supplied from the connection between the resistor 34 and thermistor 37. The resistance of the resistor 34 is selected in such a way that the base bias voltage of the transistor 38 makes the transistor conductive below the temperature where the defrosting operation is to stop. By giving the resistance this value, the transistor 38 remains conductive during the cooling operation, making the operation of the compressor motor 45 independent of the operation of the second thermostat 33 by isolating the contact $f$ of the relay 41 from the contact $e$.

For such a cooling operation, it is necessary for efficient cooling, to remove the frost sticking to the wall of the freezing compartment in a short time, without raising the temperature of the refrigerating compartment. The following is an explanation of such a freezing compartment defrosting operation.

When the gang switch G is in position for the cooling operation, the moving contact $a$ of the switch 46 contacts the fixed contact $b$, and hence, the motor 50 of the timer 48 rotates. The rotation of the motor 50 is geared down to drive a cam, which controls the operation of the switch 49. Thus, the defrosting device can be operated at a predetermined frequency by periodically closing the switch 49 of the timer 48. Such a defrosting operation is carried out at a suitable frequency to satisfy the above condition, for instance, once a day, by injecting refrigerant in a hot gaseous state (hereinafter called hot gas) into the common evaporator. When the said switch 49 of the timer 48 is closed, and the contact $f$ and the contact $g$ of the relay 41 are touching, a circuit is completed from the power source terminal 21 through the switch 46, winding 47 of the defrosting valve, the switch 49 of the timer 48, and contacts $g$ and $f$ of the relay 41 to the power source terminal 22. Energizing of the winding 47 drives the defroster valve to permit injection of the hot gas into the evaporator. At the same time, by means of the electric current flowing through the winding of the relay 51, which is connected in parallel with the winding 47 of the said defrosting valve, the relay 51 is energized to close the contacts A and B respectively. Consequently, a circuit is completed from the power source terminal 21 through the compressor motor 45, and contact A of the relay 51 to the power source terminal 22. The compressor motor 45 is thus started. With the flow of current through the winding 47 of the defrosting valve, the valve opens, and the hot gas flows from the compressor into the said evaporator. This hot gas heats the wall surface of the evaporator and the frost sticking thereto begins to melt quickly. In the meantime, the compressor motor 45 continues to rotate, even after the opening of the said switch 49 of the timer 48, due to the current flowing through the contacts B of the said relay 51, causing continued injection of the hot gas into the evaporator. When defrosting is completed, the temperature of the freezing compartment rises to a predetermined level, and the resistance of the thermistor 37 decreases and the transistor 38 is changed to a totally or nearly completely cut-off state due to a drop in the base bias voltage. As a result of the substantial increase of the resistance between the collector and emitter electrodes of the transistor 38, the current flowing through the winding of the relay 41 increases, and the contact f separates from the contact g and touches the contact e. Consequently, the circuit through the winding 47 of the defrosting valve and the winding of relay 51 is broken, and the said valve closes, thus returning the refrigerant circuit to the normal refrigerating condition, and opening the contacts A and B of the relay 51, respectively. Simultaneously, a circuit is completed from the power source terminal 21 through the compressor motor 45 and contacts e and f of the relay 41 to the power source terminal 22, and causes the said motor 45 to continue its rotation, hence causing a fast dropping of temperature of the freezing compartment. In the above-mentioned embodiment, whenever the temperature of the freezing compartment 33 rises to a predetermined degree even before the defrosting is over, the defrosting device promptly ceases its operation and the refrigerating cycle starts in order to lower the temperature of the freezing compartment.

In the refrigerator of this embodiment, the freezing operation is brought about by moving the contacts a of the switches 36, 43 and 46, respectively, into contact with fixed contacts c. When the temperature of the freezing compartment rises above a predetermined temperature established by the thermostat 33, the resistance of the thermistor 37 decreases and the base bias voltage of the transistor 38 becomes low. Consequently, the said transistor 38 is changed into a totally or nearly completely cut-off state, and the current in the winding of the relay 41 increases substantially. With this increase of current, contact f of the relay 41 separates from the contact g, and contacts the contact e completing a circuit from the power source terminal 21 through the compressor motor 45 and contacts e and f of the relay 41 to the power source terminal 22. The compressor motor 45 thus starts to rotate, and circulates refrigerant to carry out the freezing operation. As the temperature of the freezing compartment decreases, the temperature of the refrigerating compartment also decreases until it falls below the predetermined temperature established by the thermostat 25. With this decrease in the temperature, the resistance of the thermistor 27 increases, causing the base bias voltage of the transistor 28 to increase. Accordingly, the transistor 28 is changed to a conductive state and the current flowing through the winding of the relay 31 decreases until it is a negligible current. Due to this decrease in the current, the contact f of the relay 31 touches the contact g to complete a circuit from the power source terminal 21 through the heater 44, switch 43, and contacts g and f of the relay 31 to the power source terminal 22. With the completion of the said circuit, the heater 44 starts to heat the refrigeration compartment.

Thus, in the freezing operation, the temperature of the refrigeration compartment is controlled by the electronic thermostat 25 to maintain a suitable temperature for cool storing of foods. In this operation, when the temperature of the freezing compartment decreases to a predetermined level, the contacts e and f of the relay 41 separate and the compressor motor 45 stops. When the temperature of the refrigeration compartment is lower than a predetermined temperature and the temperature of the freezing compartment is higher than a predetermined temperature, the current in the winding of the relay 31 in the electronic thermostat 25 becomes very small, and causes the contact f to contact the contact g in the relay 31, resulting in feeding a current from the power source terminals 21 and 22 to the heater 44, and thereby raising the temperature of the refrigeration compartment. On the other hand, the current in the winding of the relay 41 remains large, hence keeping the contact f in contact with the contact e in the relay 41, resulting in feeding the driving current to the compressor motor 45 from the power source terminals 21 and 22, and thus continuing the cooling of the freezing compartment by driving the compressor motor 45.

There are also other means of defrosting, as described hereinafter.

One such means employing an electric heater instead of a defrosting valve is shown in FIG. 3.

In FIG. 3, the parts identical to those shown in FIG. 2 are denoted by the same reference numerals as in FIG. 2. In this embodiment, a heater 52 is used instead of the winding 47 of the defrosting valve in the embodiment of FIG. 2. This heater 52 functions to heat the surface of the common evaporator in the cooling operation at a suitable frequency, for instance, once a day. In this embodiment, by virtue of the provision of the heater 52, hot gas need not be injected and circulated into the evaporator. Thus the compressor motor 45 need not rotate during the defrosting operation. Therefore the contacts A of the relay 51 provided in the embodiment of FIG. 2 are omitted in this second embodiment. The remainder of the construction and functions of this embodiment are identical with those of the embodiment of FIG. 2 and therefore, the explanations of that embodiment apply also to this embodiment so far as the identical parts are concerned.

As will be clearly understood from the foregoing embodiments, in the refrigerator of the present invention, the temperatures of the freezing compartment and refrigeration compartment can be kept respectively at their most suitable levels assuring provision of the best facilities for cold storing of frozen foods and for cool storing of ordinary foods. Besides, in the refrigerator of the present invention, the electronic thermostat can detect a temperature drift of as little as 0.4° C., enabling the temperature control to be very precise. In addition, the defrosting action can be made far more complete than a conventional defrosting operation while, when the temperature of the freezing compartment rises above the predetermined level, the defrosting operation is automatically suspended and simultaneously, the freezing operation resumes so as to keep the compartments always at suitable temperatures. Moreover, the electronic thermostats employed in the embodiments consist of reliable semi-conductor devices and other durable electronic elements, to the long lasting satisfaction of users.

As many changes could be made in the above constructions and many different embodiments could be made without departing from the scope thereof, it is intended that all matter contained in the above description or shown in the accompanying drawings shall be interpreted as illustrative and not in a limiting sense.

What we claim is:

1. An electric refrigerator which can selectively cool and freeze, said refrigerator compising at least one freezing compartment, at least one refrigeration compartment, at least one common evaporator for carrying out freezing in the said freezing compartment and at the same time carrying out cooling in the said refrigeration compartment, a compressor motor coupled with said evaporator, and control means for controlling said motor and evaporator and comprising:

(a) a first electronic thermostat including a first thermister in said refrigeration compartment, a first transistor coupled to said first thermistor and a first relay switch coupled to said first transistor and to said compressor motor for controlling said compressor motor in accordance with the temperature of the said refrigeration compartment;

(b) a second electronic thermostat including a second thermistor in said freezer compartment, a second transistor coupled to said second thermistor, and a second relay switch coupled to said second transistor and said compressor motor for controlling said compressor motor in accordance with the temperature of the said freezing compartment;

(c) defrosting means coupled to said compressor motor and said evaporator to defrost the said evaporator by heating the said evaporator only while cooling is being carried out;

(d) heating means in said refrigeration compartment and coupled to said first thermostat to heat the said compartment under control by the said first electronic thermostat only while freezing is being carried out;

(e) manual switching means coupled to said second electronic thermostat for selecting either a cooling operation or a freezing operation by changing the electric constants of the said second electronic thermostat; and (f) a relay means coupled to said compressor motor, said heating means, said defrosting means and said manual switching means for causing said compressor motor to operate under the control of the said second thermostat, said heating means to operate under the control of the said first thermostat, and disconnecting the defrosting means from power supply when said manual switching means is thrown to select the freezing operation, and for causing said compressor motor to operate under the control of the said first thermostat, said heating means to be disconnected from the power supply, and said defrosting means to operate under the control of the said second thermostat when said manual switching means is thrown to select the cooling operation.

2. An electric refrigerator as claimed in claim 1, in which the said defrosting means comprises:

(a) injecting means for injection of hot gas into the said evaporator;

(b) a valve between said injecting means and said evaporator for controlling injection of the said hot gas; and (c) a controlling means coupled to said valve and said compressor motor for operating the compressor motor, when the said valve is open.

3. An electric refrigerator as claimed in claim 1, in which said defrosting means is an electric heater, and controlling means coupled to said heater for interrupting the power supply to the compressor motor during the operation of the said heater.

4. An electric refrigerator as claimed in claim 1 in which the first and the second electronic thermostats each comprises a bridge type circuit including the thermistor and the transistor, and further comprising resistors.

5. An electric refrigerator as claimed in claim 4 in which the second electronic thermostat includes a switch actuated by the manual switching means, and the further resistors of the bridge type circuit include two parallel connected resistors in one leg thereof respectively having value suitable for cooling and freezing, said switch connecting one or the other in said second electronic thermostat bridge type circuit.

References Cited

UNITED STATES PATENTS

| | | | |
|---|---|---|---|
| 2,489,049 | 11/1949 | Root | 165—11 |
| 3,222,882 | 12/1965 | Sutton | 62—156 |
| 3,248,892 | 5/1966 | Sutton | 62—156 |
| 3,335,576 | 8/1967 | Phillips | 62—156 |

MEYER PERLIN, Primary Examiner

U.S. Cl. X.R.

62—156, 196, 227; 165—11